(12) United States Patent
Vedula

(10) Patent No.: US 7,681,196 B2
(45) Date of Patent: Mar. 16, 2010

(54) PROVIDING OPTIMAL NUMBER OF THREADS TO APPLICATIONS PERFORMING MULTI-TASKING USING THREADS

(75) Inventor: Venkata Naga Ravikiran Vedula, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 1518 days.

(21) Appl. No.: 10/904,596

(22) Filed: Nov. 18, 2004

(65) Prior Publication Data

US 2006/0107261 A1   May 18, 2006

(51) Int. Cl.
G06F 9/46 (2006.01)
G06F 9/44 (2006.01)
G06F 15/16 (2006.01)
G06F 15/173 (2006.01)
G06F 17/18 (2006.01)

(52) U.S. Cl. .................. 718/104; 718/102; 709/201; 709/202; 709/203; 709/223; 709/226; 702/179; 702/187

(58) Field of Classification Search ......... 709/223–226, 709/201–203; 712/215, 227, 235, 239; 718/100–108, 718/102–105; 702/179, 187
See application file for complete search history.

(56) References Cited

U.S. PATENT DOCUMENTS

| | | | | |
|---|---|---|---|---|
| 5,442,758 A * | 8/1995 | Slingwine et al. | ............... | 707/8 |
| 5,727,209 A * | 3/1998 | Slingwine et al. | ............ | 718/102 |
| 5,809,450 A * | 9/1998 | Chrysos et al. | ............. | 702/186 |
| 5,835,705 A * | 11/1998 | Larsen et al. | ................. | 714/47 |
| 5,838,976 A * | 11/1998 | Summers | .................... | 717/130 |
| 5,872,913 A * | 2/1999 | Berry et al. | .................... | 714/47 |
| 5,974,536 A * | 10/1999 | Richardson | ................. | 712/215 |
| 6,078,994 A | 6/2000 | Carey | | |
| 6,098,169 A * | 8/2000 | Ranganathan | ................ | 712/227 |
| 6,119,145 A | 9/2000 | Ikeda | | |
| 6,219,690 B1 * | 4/2001 | Slingwine et al. | ........... | 718/102 |
| 6,247,121 B1 * | 6/2001 | Akkary et al. | ............... | 712/239 |
| 6,279,124 B1 * | 8/2001 | Brouwer et al. | ................ | 714/38 |
| 6,351,847 B1 * | 2/2002 | Sakamoto et al. | ........... | 717/127 |
| 6,401,155 B1 * | 6/2002 | Saville et al. | ................ | 710/266 |
| 6,487,578 B2 * | 11/2002 | Ranganathan | ................ | 718/104 |
| 6,549,930 B1 * | 4/2003 | Chrysos et al. | .............. | 718/104 |
| 6,584,488 B1 * | 6/2003 | Brenner et al. | .............. | 718/103 |
| 6,611,276 B1 * | 8/2003 | Muratori et al. | .............. | 715/772 |
| 6,658,654 B1 * | 12/2003 | Berry et al. | .................. | 717/131 |
| 7,237,242 B2 * | 6/2007 | Blythe et al. | ................. | 718/105 |

(Continued)

Primary Examiner—Meng-Ai An
Assistant Examiner—Jennifer N To
(74) Attorney, Agent, or Firm—Narendra Reddy Thappeta

(57) ABSTRACT

In an environment in which applications perform multi-tasking by using threads, the optimum number of threads to be provided to an application is determined based on historical data. Due to the use of the historical data, optimum number of threads can be accurately determined, leading to better response times for service requests, without creating unneeded overhead on system processing the service requests. In one embodiment, various status information (of potentially several prior weeks) such as number of tasks received and pending, system resources status (e.g. idle processor time and aggregate memory usage in the system), is maintained. In addition, a table may be maintained to indicate the optimum number of threads for a given combination of status information values. Thus, based on the expected status scenario, the optimum number of threads can be determined and provided at various points of time.

16 Claims, 4 Drawing Sheets

U.S. PATENT DOCUMENTS

| | | | |
|---|---|---|---|
| 7,363,369 B2 * | 4/2008 | Banerjee et al. | 709/224 |
| 7,437,725 B1 * | 10/2008 | Chang et al. | 718/100 |
| 2002/0099760 A1 * | 7/2002 | Liang | 709/107 |
| 2002/0156825 A1 * | 10/2002 | Hoover et al. | 709/105 |
| 2003/0074519 A1 * | 4/2003 | Weber | 711/105 |
| 2003/0074520 A1 * | 4/2003 | Weber | 711/105 |
| 2004/0199919 A1 * | 10/2004 | Tovinkere | 718/102 |
| 2005/0086359 A1 * | 4/2005 | Banerjee et al. | 709/232 |
| 2005/0262507 A1 * | 11/2005 | Langen et al. | 718/100 |
| 2006/0095919 A1 * | 5/2006 | Shiomi et al. | 718/104 |
| 2008/0126539 A1 * | 5/2008 | Banerjee et al. | 709/224 |

\* cited by examiner

PROVIDING OPTIMAL NUMBER OF THREADS TO APPLICATIONS PERFORMING MULTI-TASKING USING THREADS

BACKGROUND OF THE INVENTION

1. Field of the Invention

The present invention relates to design and implementation of digital processing systems, and more specifically to a method and apparatus for providing optimal number of threads to applications performing multi-tasking using threads.

2. Related Art

Multi-tasking refers to execution of multiple tasks in parallel generally sharing the same resources (e.g., processing unit, memory). Multi-tasking provides several advantages such as enabling continuation of execution of other tasks when one task is blocked, for example, awaiting the occurrence of an external event.

Applications often perform multi-tasking using threads. As is well known, a thread generally refers to a sub-set of software instructions (of a program) which can be executed by a program (implementing the application). Threads are differentiated from processes in that each process generally independently executes a complete program. Threads generally offer advantages such as management (creation, destruction, etc.) with minimal overhead (compared to processes), and thus are widely used in several environments (e.g., Java).

Threads are often initiated (created) in anticipation of future requirement of execution of tasks (e.g., tasks that would support processing of a service request such as a sales order). Such prior initiation enables the tasks to be processed soon after arrival of service requests, thereby minimizing the response time to process the service requests.

It is generally desirable to provide an optimal number of threads to applications performing multi-tasking using threads. For example, providing fewer threads (than needed) could lead to degradation (high) response times since time would be consumed either to initiate additional threads, or to wait for a thread to be freed. On the other hand, initiating more threads would lead to unneeded overhead in creation and termination (destruction) of threads, as well as memory overhead.

In one prior embodiment, the number of threads provided to an application is determined based on static configuration according to a pre-specified convention (e.g., in a pre-specified file). Unfortunately, the application may need different number of threads at different points of time, and accordingly fewer or more threads (compared to an optimal number) may be provided, potentially leading to various undesirable results noted above.

Accordingly what is needed is a method and apparatus for providing optimal number of threads to applications performing multi-tasking using threads.

BRIEF DESCRIPTION OF THE DRAWINGS

The present invention will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

1. Overview

According to an aspect of the present invention, historical data indicating the number of threads required to support execution of an application at various prior instances of time is maintained, and the data is used to determine the number of threads to be made available to the application at a present instance of time. Due to the use of such historical data, an optimal number of threads may be provided to the application at any instance of time.

Various aspects of the present invention are described below with reference to an example problem. Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the features of the invention.

2. Example Environment

Figure 1:
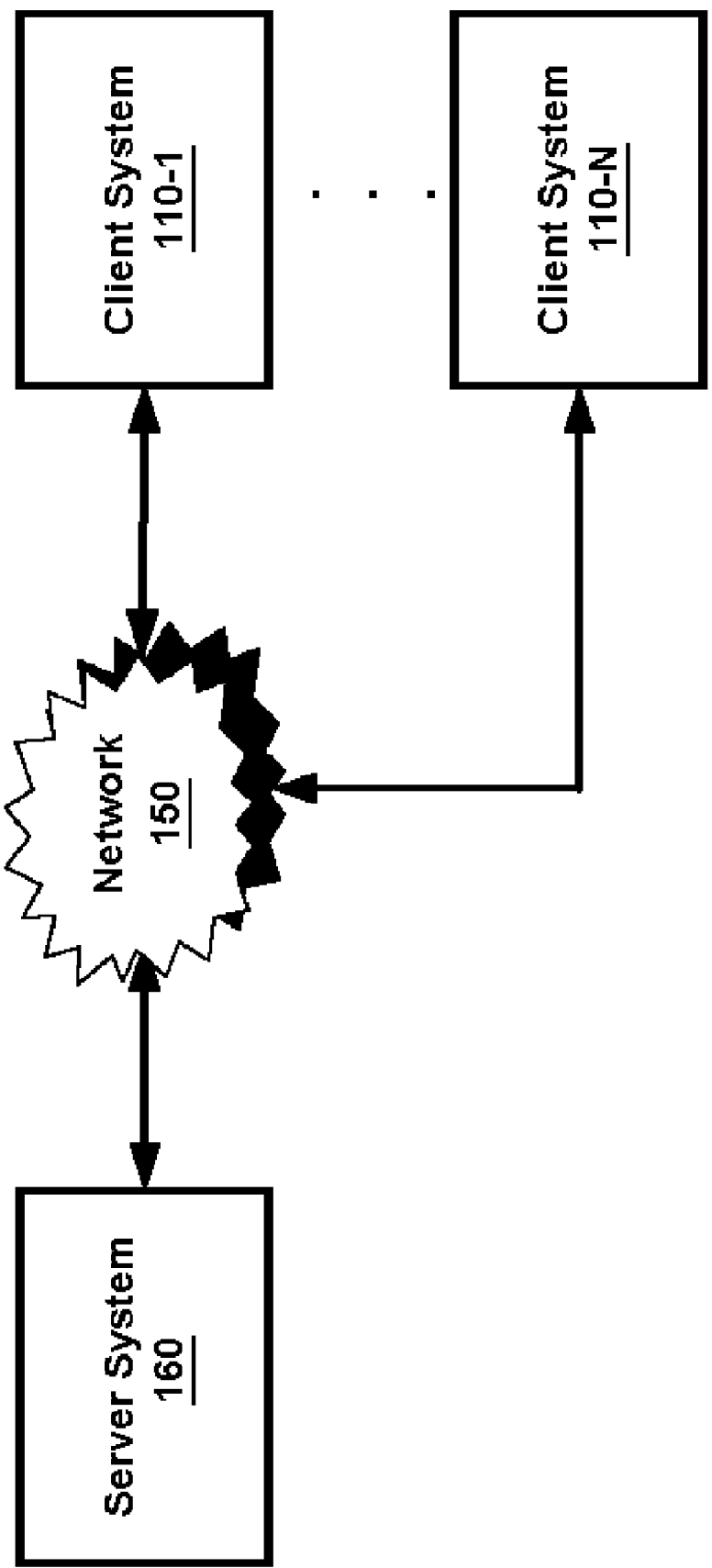
FIG. 1 is a block diagram of an example environment in which various aspects of the present invention can be implemented.

FIG. 1 is a block diagram illustrating an example environment in which various aspects of the present invention can be implemented. The environment is shown containing client systems 110-1 through and server system 160 communicating with each other over network 150. Network 150 may be implemented using protocols such as Internet Protocol.

Server system 160 executes various applications, which perform multi-tasking using threads. In an embodiment, server system 160 is implemented in Java programming environment, which supports multi-tasking using threads. Accordingly various aspects of the present invention are described below with reference to server system 160. However, several aspects can be practiced in other types of systems which supports multi-tasking using threads, as will be apparent to one skilled in the relevant arts by reading the disclosure provided herein.

Client systems 110-1 through 110-N may send various service requests (e.g., to process an order or update inventory), which may be processed by applications (in server system 160) by execution of one or more tasks corresponding to each service request. Each task may be allocated to a thread (for execution).

As described in the background section above, it is generally desirable to provide an optimum number of threads to applications. The manner in which such a feature can be attained is described below.

3. Flow-Chart

Figure 2:
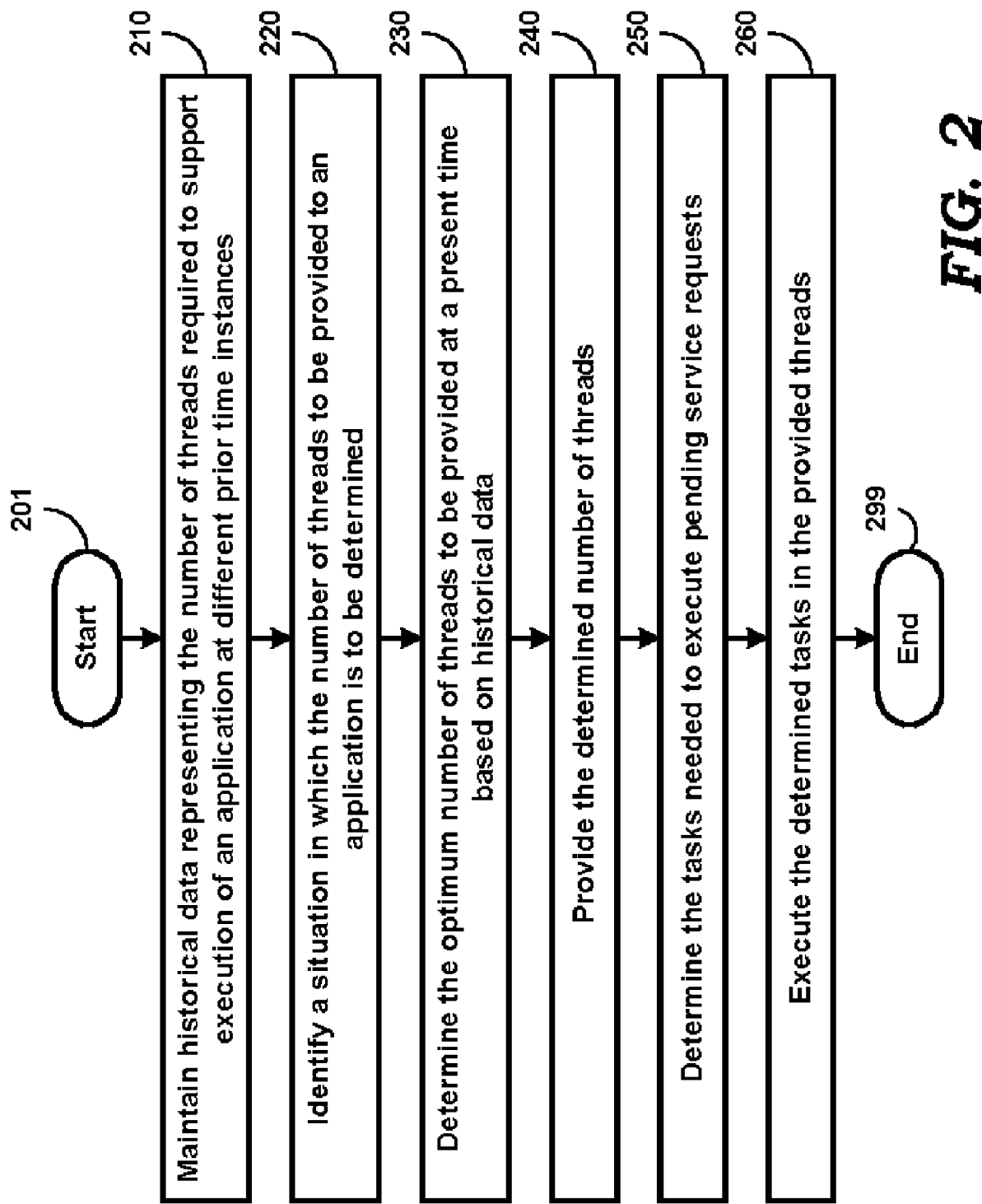
FIG. 2 is a flow chart illustrating the manner in which a system can provide an optimal number of threads to support an application processing service requests in an embodiment of the present invention.

FIG. 2 is a flow-chart illustrating the manner in which optimum number of threads may be provided to applications, according to an aspect of the present invention. The flow chart is described with reference to server system 160 of FIG. 1 merely for illustration. However, the features can be implemented in other environments/systems as well. The flow chart begins in step 201, in which control immediately passes to step 210.

In step 210, server system 160 may maintain historical data indicating the number of threads required to support an application at different prior time instances (including, but not limited to, time points and intervals). For example, the type of historical data may include one or more of the number of tasks arriving in various prior intervals; the number of threads that were available, used or unused in various intervals; and the number of tasks pending at different time points. The data may be stored in log files provided on secondary storage (non-volatile memory).

In step 220, a situation in which the number of threads to be provided to an application is to be determined, is identified. One example of such a situation is the receiving of a request to create threads from an application executing in server system 160. The request may be received, for example, when the application is being initialized or later when application needs to process requests from client systems 110-1 through 110-N. Other examples of the situation include number of tasks pending execution exceeding a pre-specified threshold, pre-specified time intervals or time points, etc.

In step 230, the optimum number of threads to be provided at the present time is determined based on historical data stored in step 210. It should be appreciated that various other parameters (e.g., the number of threads presently available to the application, the number of threads not being used, i.e., in a suspended state) may also be used in determining the number of threads to be provided now.

In step 240, the determined number of threads are provided. Operations such as creating additional threads, or terminating suspended threads, may be performed to provide only the determined number of threads.

In step 250, the tasks needed to execute pending service requests are determined. In general, the specific tasks needed, and the determination depends on the design of the application which processes the service requests (typically received from various external systems), and can be implemented in a known way.

In step 260, the determined tasks are then executed in the provided threads. In general, the features (e.g., operating system or other environment factors) provided by server system 110 enables the application to execute the tasks by using the provided threads. In one embodiment described below, the tasks are placed in a queue and the threads pick/select the tasks in the queue for execution.

Due to the optimal number of threads provided in step 230 in various situations, optimal number of threads may be available for the execution of the tasks, thereby providing superior throughput performance in processing service requests, while avoiding unneeded overhead by creating more than optimal number of threads. The method ends in step 299.

It should be appreciated that the above features can be implemented using various approaches. An example approach is described in further detail below.

4. Block Diagram

Figure 3:
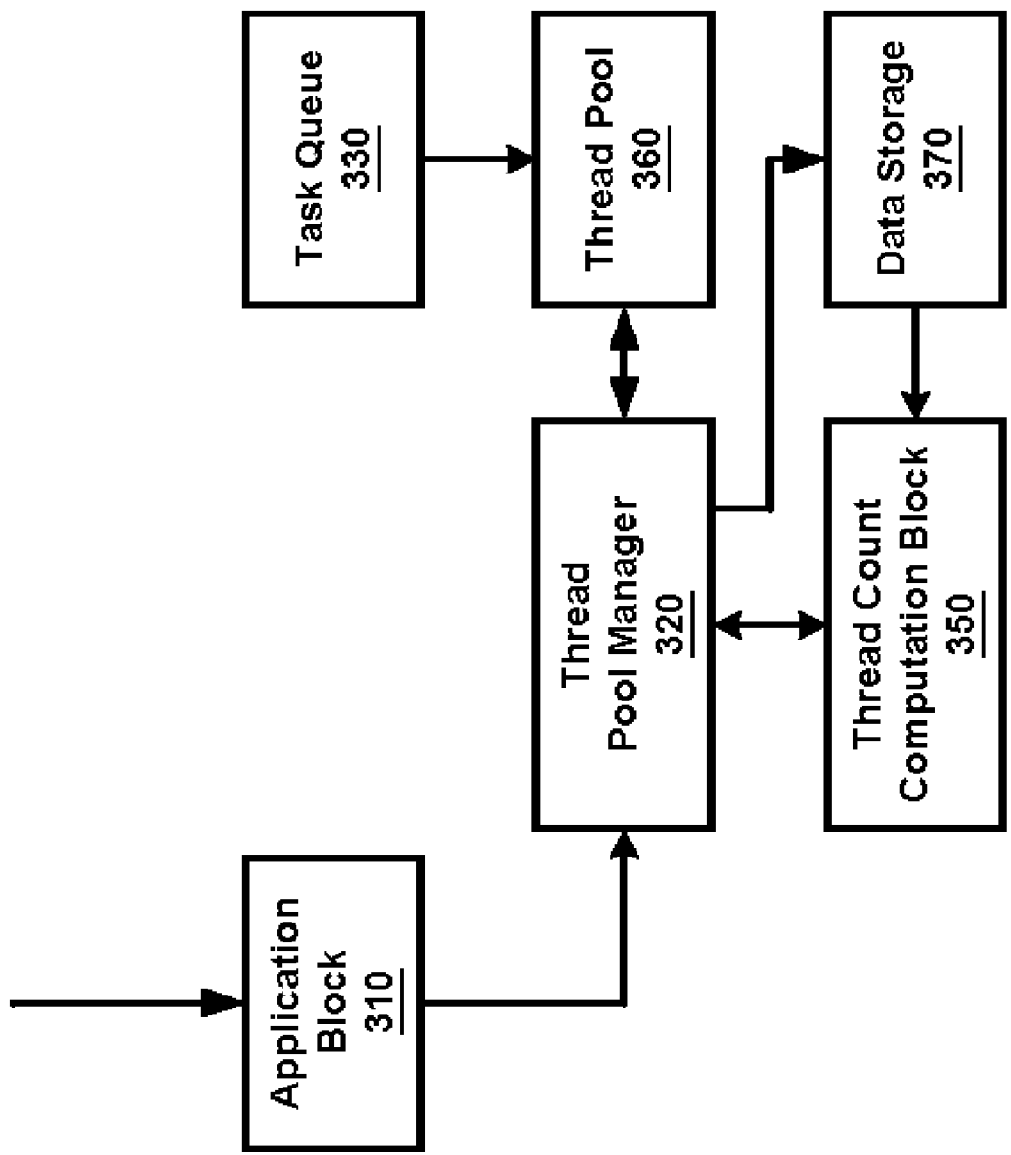
FIG. 3 is a block diagram illustrating the details of an example system implemented according to various aspects of the present invention.

FIG. 3 is a block diagram illustrating the manner in which server system 160 supports applications, which process service requests in an embodiment of the present invention. Server system 160 is shown containing application block 310, thread pool manager 320, task queue 330, thread count computation block 350, thread pool 360, and data storage 370. Each component is described below in further detail.

Application block 310 represents applications which process various service requests, for example, which are received from client systems 110-1 through 110-N. Application block 310 may interface with thread pool manager 320 to request creation of threads, for example, at the time of initialization. Application block 310 further determines the tasks to be executed to process corresponding service requests, and interfaces with thread pool manager 320 to place the tasks in task queue 330.

Task queue 330 contains several tasks provided according to various aspects of the present invention. In an embodiment, each thread is designed to examine task queue 330 for any pending tasks, and tasks are picked or selected on a first come first serve basis for execution. Thus, in the example embodiment of FIG. 3, the operating environment of server system 160 enables thread pool manger 320 to execute tasks (received from application block 310) by placing the tasks in task queue 330. However other approaches can be used to enable an application to execute tasks using threads.

Thread pool manager 320 performs various management operations (creation, termination, etc.) with respect to threads in thread pool 360, which execute the tasks in task queue 330. The total number of threads that are to be made available (at a present time) to an application may be received from thread count computation block 350, and thread pool manager 320 creates additional threads or permits termination of suspended threads to ensure such total number of threads are available in thread pool 360 for the application.

Accordingly, thread pool manager 320 may be designed to track the number of threads in thread pool 360, the status of various threads in thread pool 360, etc. In addition, thread pool manager 320 may store various status information (number of threads in suspended state, length of task queue 330, total number of threads in thread pool 360) in data storage 370. Some of such stored information may form historical data, which is used by thread count computation block 350, as described below.

Thread count computation block 350 determine the optimum number of threads to be provided at a present time to each application based on historical data. Various approaches can be used to determine the optimum number of threads. An example approach to determining the optimum number is described below in further detail below.

5. Determining Optimum Number of Threads

In one embodiment, the historical data includes various status information (at different time points) such as the number of tasks arriving in an interval prior to a time point, the number of tasks pending in task queue 360, the resource status (e.g., processor idle time and memory usage), and response time characterization (e.g., average/median times to complete processing a service request after arrival of service requests).

Data storage 370 may further store a mapping which maps each combination of the status information (or sub-columns thereof, as deemed sufficient by a designer) values to a corresponding optimum number of threads. Such optimum number of threads may be determined by stress tests and according to the desired response times for each application.

Thus, thread count computation block 350 may need to examine the historical data to determine the expected status in the near future, and determine the optimum number of threads for the expected status.

It may be appreciated that a table may be generated to indicate the optimum number of threads for each combination of status information values. However, for a large number of combinations, the look-up may require substantial computation complexity and/or memory space. Accordingly, it may be desirable to model the status information as a polynomial, which generates the optimum number of threads as an output.

Thus, assuming there are four variables in the status information, and that each variable can be represented by a sub-polynomial of a second degree, the table (mapping status information values to the optimum number of threads) can be represented as follows:

$$\text{Optimum thread count} = S1*S2*S3*S4 \qquad \text{Equation (1)}$$

Wherein S1-S4 represent polynomials corresponding to the four variables.
and wherein $$S1=(a1\times1^2+a2\times1+a3);$$

$$S2=(b1\times2^2+b2\times1+b3);$$

$$S3=(c1\times3^2+c2\times3+c3);$$

$$S4=(d1\times4^2+d2\times4+d3);$$

wherein a1-a3, b1-b3, c1-c3, and d1-d3 represent coefficients of the respective polynomials, and * and + represent multiplication and addition operations.

In one embodiment, various features described above are operative when software instructions are executed on a digital processing system, and the details of a corresponding embodiment are described below in further detail.

6. Digital Processing System

Figure 4:
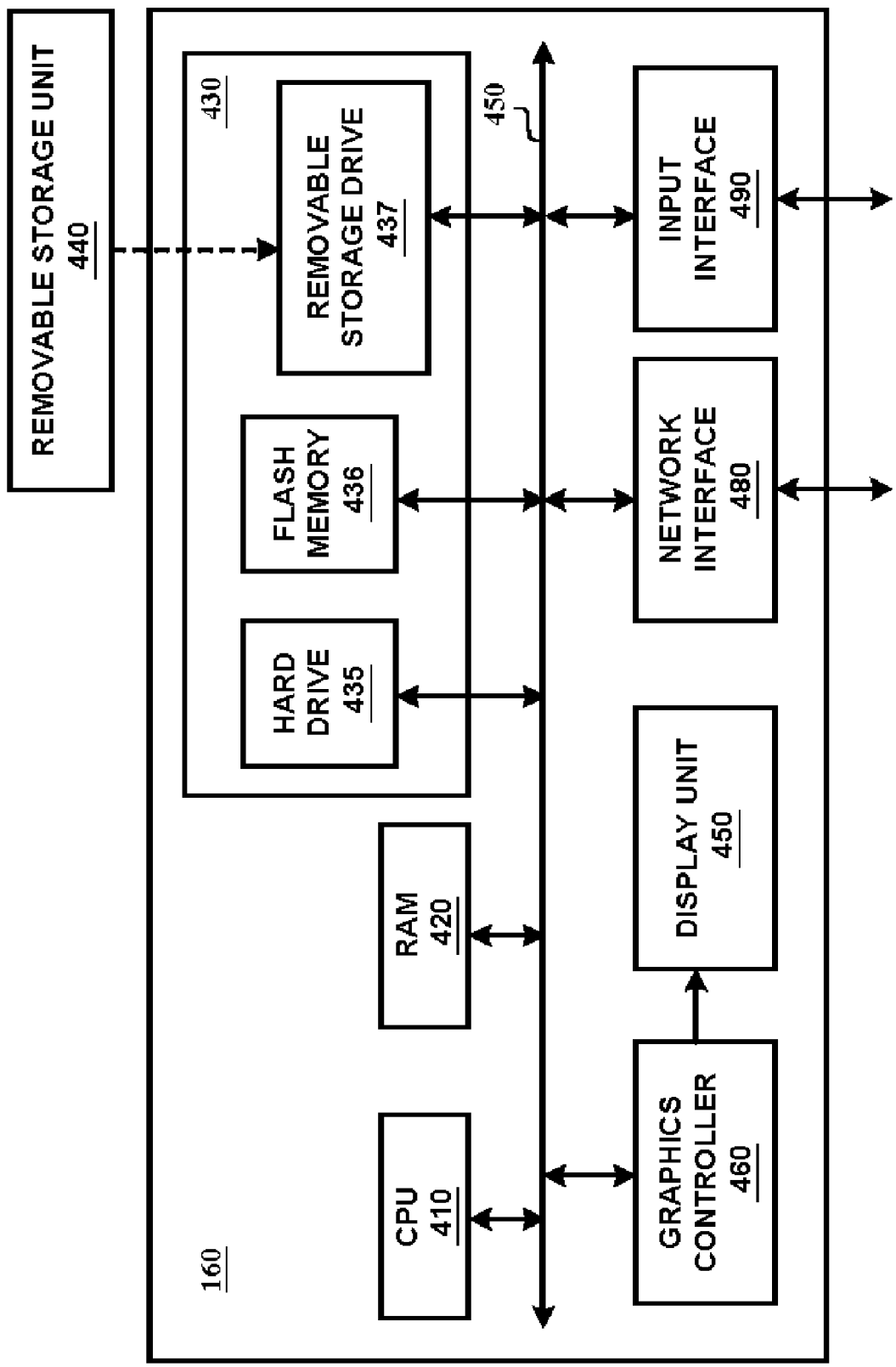
FIG. 4 is a block diagram illustrating an example embodiment in which various aspects of the present invention are operative when software instructions are executed.

FIG. 4 is a block diagram illustrating the details of digital processing system 400 in which various aspects of the present invention are operative by execution of appropriate software instructions. System 400 may correspond to server system 160. System 400 may contain one or more processors such as central processing unit (CPU) 410, random access memory (RAM) 420, secondary memory 430, graphics controller 460, display unit 470, network interface 480, and input interface 490. All the components except display unit 470 may communicate with each other over communication path 450, which may contain several buses as is well known in the relevant arts. The components of FIG. 4 are described below in further detail.

CPU 410 may execute instructions stored in RAM 420 to provide several features of the present invention. CPU 410 may contain multiple processing units, with each processing unit potentially being designed for a specific task. Alternatively, CPU 410 may contain only a single general purpose processing unit. RAM 420 may receive instructions from secondary memory 430 using communication path 450.

Graphics controller 460 generates display signals (e.g., in RGB format) to display unit 470 based on data/instructions received from CPU 410. Display unit 470 contains a display screen to display the images defined by the display signals. Input interface 490 may correspond to a key-board and/or mouse. Network interface 480 provides connectivity to a network (e.g., using Internet Protocol), and may be used to receive various service requests and to provide the corresponding responses.

Secondary memory 430 may contain hard drive 435, flash memory 436 and removable storage drive 437. Secondary memory 430 may store the data and software instructions (e.g., methods instantiated by each of client system), which enable system 400 to provide several features in accordance with the present invention. Some or all of the data and instructions may be provided on removable storage unit 440, and the data and instructions may be read and provided by removable storage drive 437 to CUP 410. Floppy drive, magnetic tape drive, CD-ROM drive, DVD Drive, Flash memory, removable memory chip (PCMCIA Card, EPROM) are examples of such removable storage drive 437.

Removable storage unit 440 may be implemented using medium and storage formate
compatible with removable storage drive 437 such that removable storage drive 437 can read
the data and instructions. Thus, removable storage unit 440 includes a computer readable storage medium having stored therein computer software and/or data.

In this document, the term "computer program product" is used to generally refer to
removable storage unit 440 or hard disk installed in hard drive 435. These computer program products are means for providing software to system 400. CPU 410 may retrieve the software instructions, and execute the instructions to provide various features of the present invention described above.

7. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method of supporting an application in a system, said method comprising:

maintaining a historical data representing a number of threads required to support execution of said application at different prior time instances;

determining an optimum number of threads to be provided in a near future based on said historical data;

providing said optimum number of threads at a present time to said application in said system;

receiving a plurality of service requests after said providing;

placing a plurality of tasks in a task queue, wherein said plurality of tasks are required to be executed to process said plurality of service requests, wherein each of said threads is designed to examine said task queue and then select and execute any of the pending tasks in said task queue; and enabling said application to execute said plurality of tasks using said optimum number of threads, whereby said optimum number of threads are provided to said application before said plurality of service requests are received by said system.

2. The method of claim 1, further comprises storing a mapping which maps of each of a plurality of combination of status information values to a corresponding optimum number of threads, wherein said determining maps a combination of status information values representing a status in the near future to a corresponding optimum number of threads using said mapping.

3. The method of claim 2, wherein said mapping is represented in the form of a table.

4. The method of claim 2, wherein said mapping is represented in the form of a polynomial.

5. The method of claim 2, wherein said historical data is stored in a non-volatile memory.

6. The method of claim 5, wherein said historical data comprises data corresponding to more than one day.

7. The method of claim 2, wherein said status in the near future is determined based on said historical data.

8. The method of claim 1, wherein said providing comprises creating at least one thread, whereby said at least one thread is contained in said optimum number of threads and said application is executed using said at least one thread also,
wherein said present time corresponds to a duration in which said application is being initialized such that said optimum number of threads are provided at the time of initialization of said application.

9. A computer readable medium storing one or more sequences of instructions for causing a system to support an application, wherein execution of said one or more sequences of instructions by one or more processors contained in said system causes said system to perform the actions of:
maintaining a historical data representing a number of threads required to support execution of said application at different prior time instances;
determining an optimum number of threads to be provided in a near future based on said historical data;
providing said optimum number of threads at a present time to said application in said system;
receiving a plurality of service requests after said providing;
placing a plurality of tasks in a task queue, wherein said plurality of tasks are required to be executed to process said plurality of service requests, wherein each of said threads is designed to examine said task queue and then select and execute any of the pending tasks in said task queue; and
enabling said application to execute said plurality of tasks using said optimum number of threads,
whereby said optimum number of threads are provided to said application before said plurality of service requests are received by said system.

10. The computer readable medium of claim 9, further comprises storing a mapping which maps of each of a plurality of combination of status information values to a corresponding optimum number of threads, wherein said determining maps a combination of status information values representing a status in the near future to a corresponding optimum number of threads using said mapping.

11. The computer readable medium of claim 10, wherein said mapping is represented in the form of a table.

12. The computer readable medium of claim 10, wherein said mapping is represented in the form of a polynomial.

13. The computer readable medium of claim 10, wherein said historical data is stored in a non-volatile memory.

14. The computer readable medium of claim 13, wherein said historical data comprises data corresponding to more than one day.

15. The computer readable medium of claim 10, wherein said status in the near future is determined based on said historical data.

16. A digital processing system:
a random access memory (RAM);
a processor;
a computer readable medium to store one or more instructions which are designed to be retrieved into said RAM and to be executed by said processor to perform the actions of:
maintaining a historical data representing a number of threads required to support execution of said application at different prior time instances;
determining an optimum number of threads to be provided in a near future based on said historical data;
providing said optimum number of threads at a present time to said application in said system;
receiving a plurality of service requests after said providing;
placing a plurality of tasks in a task queue, wherein said plurality of tasks are required to be executed to process said plurality of service requests, wherein each of said threads is designed to examine said task queue and then select and execute any of the pending tasks in said task queue; and
enabling said application to execute said plurality of tasks using said optimum number of threads,
whereby said optimum number of threads are provided to said application before said plurality of service requests are received by said digital processing system.

* * * * *

UNITED STATES PATENT AND TRADEMARK OFFICE
CERTIFICATE OF CORRECTION

PATENT NO. : 7,681,196 B2  Page 1 of 1
APPLICATION NO. : 10/904596
DATED : March 16, 2010
INVENTOR(S) : Venkata Naga Ravikiran Vedula It is certified that error appears in the above-identified patent and that said Letters Patent is hereby corrected as shown below:

In column 6, line 15, delete "CUP" and insert -- CPU --, therefor.

In column 6, line 20, delete "formate" and insert -- format --, therefor.

Signed and Sealed this

Twenty-first Day of September, 2010

David J. Kappos
*Director of the United States Patent and Trademark Office*